United States Patent Office 3,451,860
Patented June 24, 1969

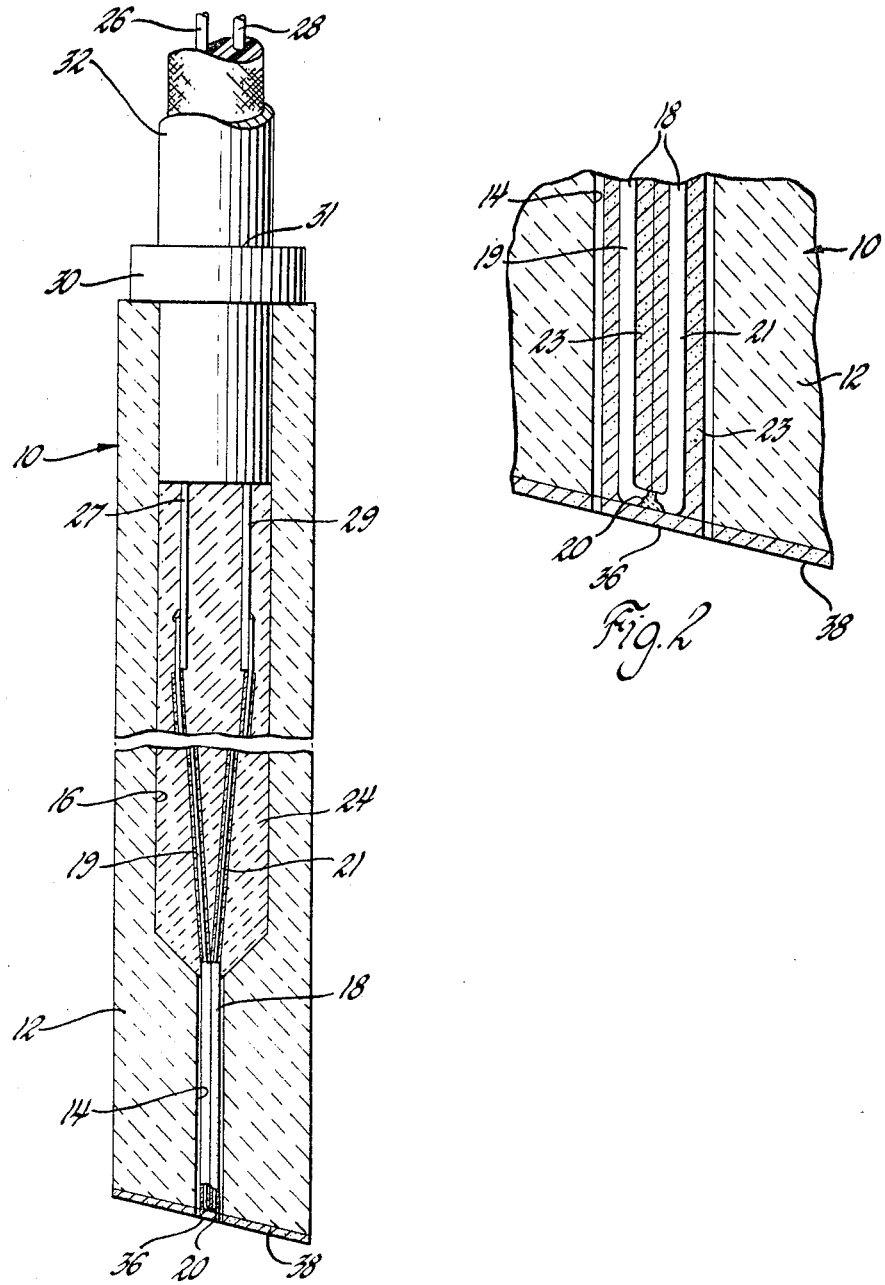

3,451,860
**THERMOCOUPLE WITH REDUCING ATMOS-
PHERE PRODUCING SHEATH**
Karl Schwartzwalder, Holly, and Morris Berg, Grand
Blanc, Mich., assignors to General Motors Corporation, Detroit, Mich., a corporation of Michigan
Filed Dec. 17, 1965, Ser. No. 514,580
Int. Cl. H01v 1/02
U.S. Cl. 136—230                                5 Claims

ABSTRACT OF THE DISCLOSURE

A thermocouple assembly having a fast temperature response for measuring temperatures up to 4000° F. for a period of time up to 15 minutes is disclosed. The thermocouple assembly has a temperature sensing junction which is positioned in a strong ceramic insulator which has been impregnated with an oxidizable material. The temperature sensing junction has a thin ceramic coating on the end thereof. The oxidizable material in the impregnated insulator oxidizes at high temperatures to form a reducing atmosphere about the thermocouple junction which prevents the junction from being oxidized at high temperatures. The thin ceramic coating permits the thermocouple to have a temperature response of the order of 50 milliseconds or less and protects the thermocouple junction from being eroded when the thermocouple passes through gas at high speed.

---

This invention relates to thermocouples, and more particularly to thermocouples having a fast response which are employed at elevated temperatures.

Fast, accurate high temperature measurements are necessary for space vehicles to safely reenter the earth's atmosphere from outer space. The high speed at which a space vehicle enters and passes downward through the earth's atmosphere causes the space vehicle to heat up. During the initial period in which a space vehicle reenters the earth's atmosphere, the temperature of the space vehicle nose rises to between 3000° and 4000° F. for a time period of up to 15 minutes. Thermocouple assemblies which are located in the space vehicle nose must withstand these elevated temperatures for the time period indicated. Due to the high speed of the space vehicle, it is necessary to measure the temperature of the space vehicle nose with a time lag of 50 milliseconds or less, that is, the temperature measuring device must convey the temperature of the vehicle nose to the observer in the space vehicle within 50 milliseconds. Thermocouple assemblies in which the thermocouple junction is completely encased in a protective shield have a time lag greater than 50 milliseconds and as a result, are not suitable for this type of application. Thermocouple assemblies having the thermocouple junction exposed to the atmosphere may have a response of 50 milliseconds or less; however, thermocouple assemblies of this type cannot be successfully used to measure temperatures in the range of 3000 to 4000° F. because the metal at the thermocouple junction oxidizes and erodes. Oxidation and erosion of the thermocouple junction causes a burning away and a wearing away of the junction which results in the recession of the junction into the thermocouple assembly with a consequent loss of thermocouple response and sensitivity.

It is the primary object of this invention to provide a thermocouple assembly having a fast response which will measure temperatures up to 4000° F. for 15 minutes in an oxidizing atmosphere.

This and other objects of this invention are accomplished by a thermocouple assembly in which the thermocouple metal elements are mounted in the centerbore of a carbon impregnated ceramic insulator. The end of the thermocouple junction is exposed to the atmosphere at one end of the ceramic insulator. This exposed end of the thermocouple junction is coated with a thin ceramic film. At elevated temperatures the carbon in the carbon impregnated ceramic oxidizes to provide an atmosphere of carbon monoxide and carbon dioxide about the junction end of the thermocouple metal elements. The carbon monoxide-carbon dioxide atmosphere inhibits the oxidation of the thermocouple junction. The thin, ceramic film on the end of the thermocouple junction inhibits the erosion of the thermocouple junction caused by the air flow. The carbon monoxide-carbon dioxide atmosphere and the thin ceramic film on the end of the thermocouple junction inhibit the oxidation and erosion of the thermocouple junction sufficiently to enable the thermocouple to operate with a fast response at temperatures up to 4000° F. for 15 minutes.

Other objects and advantages of this invention will be apparent from the following detailed description, reference being made to the accompanying drawings wherein a preferred embodiment of this invention is shown.

In the drawings:

FIGURE 1 is a view partly in cross section and partly in elevation of a thermocouple assembly embodying this invention;

FIGURE 2 is an enlarged cross sectional view of the temperature sensitive end of the thermocouple assembly shown in FIGURE 1.

Referring now to the embodiment shown in FIGURE 1, the thermocouple assembly 10 comprises a carbon impregnated ceramic insulator 12 formed with a centerbore having an end portion 14 of relatively small diameter and a second portion 16 of larger diameter. The ceramic in the insulator 12 is zirconia. Zirconia is the preferred ceramic for the thermocouple assembly since it is compatible, both physical and chemical, with existing space vehicle nose cap structures. However, other ceramics such as alumina, beryllia, mullite, and the like may be used. The zirconia insulators are formed by blending 1470 grams zirconium oxide (Zirocast 60D, Zirconium Corporation of America) with 300 grams of a 10% solution of paraffin wax in trichloroethane. The mixture is mixed thoroughly until the batch is nearly dry. The batch is then dried for 2 to 3 hours in a ventilated oven at 250° F. to remove the remaining solvent. The dried material is then passed through a 48 mesh screen form to break up any lumps. The insulator blanks are formed by using conventional laboratory hand-operated isostatic molding presses at 5000 p.s.i. The insulator blanks are fired through a continuous tunnel kiln to 3050° F. on a 15-hour total cycle with a heating cycle of 7 hours and a hold time at 3050° F. of 1¼ hours. The fired blanks are then ground to form cylindrical ceramic insulators. After the grinding operation the insulator blanks are fired to 3200° F. in 8 hours with a 1 hour hold at 3200° F.

These porous, fired insulator blanks are impregnated with carbon by immersing the blanks in a solution containing 250 grams of a polyester resin, 1.25 grams of cobalt naphthenate (6% cobalt) and 0.6 cc. of methylethyl ketone peroxide. Any high carbon producing liquid which, upon catalyzing, will set up to a solid without loss of a volatile material may be used. While both polyester resins and epoxy resins will cure to 100% solids upon catalyzing, polyester resins are preferred because they are generally less viscous than the epoxy resins and are therefore easier to use in impregnating the ceramic. Polyester resins are formed typically by reacting a dibasic acid such as phthalic acid, adipic acid, azelate acid or isophthalate acid with a dihydric alcohol such as ethylene glycol, propylene glycol, 2,3-butylene glycol, diethylene glycol or dipropylene glycol. Commercially available epoxy resins are usualy formed by reacting bisphenol A with epichlorohydrin. The cobalt napthenate and methylethyl ketone peroxide are catalysts for a polyester-type resin. The container holding the carbon producing solution and the insulator blanks is placed in a vacuum system, evacuated to 28 inches mercury on the vacuum gauge and held there 45 minutes. The resin will jell during this time. The insulator blanks are then removed from the solution and heated for approximately 30 minutes in an oven at 220° F. to accelerate hardening of the resin. The insulator blanks are then placed in graphite crucibles and covered with carbon black. These crucibles are then heated in a furnace for 1 hour at 1600° F. to convert the resin to carbon. The insulator blanks are then removed from the crucible and any loosely clinging carbon black blown off with an air hose. The carbon impregnation steps may be repeated a second time to insure that all of the air is removed from the coarse insulator blank and that all openings are filled with carbon. The primary purpose of the carbon in the ceramic insulator is to provide a protective carbon monoxide-carbon dioxide atmosphere in the insulator centerbore portion 14 at elevated temperatures. Carbon is the preferred material for the impregnated ceramic insulator. Other suitable materials may be used to impregnate the ceramic which will provide a nonoxidizing atmosphere at elevated temperatures such as lithium hydride or aluminum nitride.

Positioned within the insulator centerbore is a thermocouple 18 having a junction 20 positioned in the end of the centerbore end portion 14. The thermocouple is fabricated with a tungsten ribbon 19, and 74% tungsten-26% rhenium alloy ribbon 21. Other refractory metals such as tantalum, molybdenum, iridium, niobium and rhodium or their alloys may be employed as the thermocouple metal elements. The metals are used in the form of a ribbon although, if preferred, they may be used in a wire form. Preferably the thickness of the ribbon is 0.002 inch and has a width of 0.05 inch. Ribbons having a thickness of 0.001 inch are difficult to obtain and difficult to assemble into thermocouples. The thermocouple ribbons are separated from each other in the insulator centerbore portion 14 by magnesium oxide insulation 23 having a thickness on each side of the ribbon of 0.002 inch. Magnesium oxide spraying powder having a particle size of −100 mesh-plus 325 mesh is flame sprayed onto the thermocouple ribbons. Beryllium oxide is an acceptable insulator material for this purpose; however, it is not preferred since health hazard precautions have to be employed when beryllium oxide is used. The space between the walls of the insulator centerbore end portion 14 and the insulated thermocouple ribbons 19 and 21 should be kept as small as possible in order to prevent vibration of the thermocouple ribbons and in order to insure that the space will be filled with the protective atmosphere. If the space becomes too big there may not be sufficient carbon monoxide and carbon dioxide present in the space to inhibit oxidation of the thermocouple junction. The maximum distance between the walls of the insulator centerbore end portion 14 and the thermocouple ribbons 19 and 21 is of the order of 0.006 inch in the preferred embodiment.

The thermocouple ribbons 19 and 21 are supported in the insulator centerbore 16 by a refractory cement 24. The cement 24 must be sufficiently refractory to withstand the elevated temperature and it must be a good electrical insulator. Zirconia based refractory cement and calcium aluminate based refractory cement are examples of suitable cements. This cement fills the insulator centerbore 16 to provide a support for the thermocouple and to keep air away from the thermocouple. The thermocouple ribbons 19 and 21 are connected to the leads 26 and 28 respectively.

The thermocouple ribbons 19 and 21 are welded to the bare, uninsulated ends 27 and 29 of lead wires 26 and 28 which have the same composition as the ribbon to which they are welded. The lead wires 26 and 28, which are separated and insulated with fiberglass insulation, are covered by a platinum sheath 32. The ceramic insulator 12 is joined to the sheath 32 by means of a platinum collar 30 and a gold nickel alloy braze ring 31.

As shown in FIGURE 2, the ends of thermocouple ribbons 19 and 21 are joined together to form the junction 20. The temperature sensitive end of the thermocouple 10 is flame-plasma sprayed with zirconium oxide to form a layer 38 on the end of the carbon impregnated zirconia insulator 12 and a layer 36 at the end of the thermocouple junction 20. Layers 36 and 38 are 0.001 to 0.002 inch thick. Layers 36 and 38 provide protection against erosion which is caused by the air when the space vehicle nose cone passes through the air at a high speed. The thickness of layer 36 is sufficiently thick to provide protection against erosion of the thermocouple junction 20 and at the same time it is not thick enough to significantly slow the response of the thermocouple.

In use, the thermocouple assemblies are installed near the apex of the space vehicle nose as well as on the side of the space vehicle nose. As the space vehicle enters and passes downward through the earth's atmosphere, the temperature of the nose cone and therefore the thermocouple assembly 10 rises. The carbon in the carbon impregnated ceramic insulator 12 is oxidized to form carbon monoxide and carbon dioxide gases. These gases flow into the narrow space separating the insulator centerbore portion 14 walls and the insulated thermocouple ribbons 19 and 21. It is believed that the carbon monoxide-carbon dioxide atmosphere which is formed also passes over the thermocouple junction 20, thereby inhibiting the oxidation of the thermocouple junction 20 and the thermocouple ribbons 19 and 21. The erosion protection afforded by the ceramic layer 36 at the end of the junction 20 and the carbon monoxide-carbon dioxide atmosphere in the insulator centerbore portion 14 at elevated temperatures, combine to provide sufficient protection against erosion and oxidation to permit the thermocouple junction to measure temperatures up to 4000° F. for a time up to 15 minutes and to have a fast response.

While the invention has been described in terms of a preferred embodiment, it is to be understood that the scope of the invention is not so limited thereby except as defined in the following claims.

We claim:
1. A thermocouple assembly having a fast temperature response for measuring temperatures up to 4000° F. for a period of time up to 15 minutes comprising thermocouple metal elements joined at one end to form a temperature sensing junction, a strong, rigid ceramic insulation sheath containing an oxidizable material uniformly dispersed therethrough surrounding said thermocouple elements longitudinally thereof up to the end of said junction, said sheath in spaced relation about said junction end of said thermocouple elements to provide a space therebetween, said sheath operative to provide said assembly with sufficient strength to withstand the stress incurred when said assembly passes through a gas at high speed, said material in said sheath being adapted to oxidize to form an atmosphere about said junction in said space which protects said junction from being oxidized when said junction is exposed to high temperatures, and a thin ceramic layer coating said junction operative to permit said junction to measure the temperature with a time lag of the order of 50 milliseconds or less and being adapted to protect said junction from being eroded when said junction passes through a gas at high speed.

2. A thermocouple assembly as described in claim 1 wherein said ceramic insulation sheath is impregnated with carbon.

3. A thermocouple assembly as described in claim 1 wherein the ceramic in said ceramic insulation sheath is zirconia.

4. A thermocouple assembly as described in claim 1 wherein said thermocouple metal elements are tungsten and a tungsten-rhenium alloy.

5. A thermocouple assembly as described in claim 1 wherein said thermocouple metal elements have a thin ceramic insulation layer thereon.

References Cited

UNITED STATES PATENTS

| | | | |
|---|---|---|---|
| 1,849,832 | 3/1932 | Herzog et al. | 136—232 X |
| 2,223,408 | 12/1940 | Dietert | 136—234 |
| 3,048,641 | 8/1962 | Erlebacher | 136—232 |
| 3,091,119 | 5/1963 | Fischer et al. | |

FOREIGN PATENTS 822,916  11/1959  Great Britain.

JOHN H. MACK, *Primary Examiner.*

M. J. ANDREWS, *Assistant Examiner.*